US009759374B1

(12) United States Patent
Lair

(10) Patent No.: US 9,759,374 B1
(45) Date of Patent: Sep. 12, 2017

(54) GRAVITY DESCENDING—MOTORIZED ASCENDING LOAD CARRYING PLATFORM

(71) Applicant: Jean-Pierre Lair, San Antonio, TX (US)

(72) Inventor: Jean-Pierre Lair, San Antonio, TX (US)

( * ) Notice: Subject to any disclaimer, the term of this patent is extended or adjusted under 35 U.S.C. 154(b) by 68 days.

(21) Appl. No.: 14/996,645

(22) Filed: Jan. 15, 2016

(51) Int. Cl.
*F16M 13/00* (2006.01)
*F16M 13/02* (2006.01)

(52) U.S. Cl.
CPC .................................. *F16M 13/022* (2013.01)

(58) Field of Classification Search
CPC ....... E04B 9/006; F16M 13/027; F21V 21/38; A47B 2005/003
USPC ................ 248/317, 320, 321, 328, 329, 332
See application file for complete search history.

(56) References Cited

U.S. PATENT DOCUMENTS 3,469,814 A * 9/1969 Carlson .................... A47G 1/24 248/320
5,366,203 A * 11/1994 Huffman ................. E04B 9/003 248/277.1
5,568,189 A * 10/1996 Kneller .................. H04N 5/222 248/58
6,161,702 A * 12/2000 Campbell ................ B62H 3/12 211/1.57
6,345,799 B1 * 2/2002 Fusi ....................... F16M 11/18 248/277.1
6,367,757 B1 * 4/2002 Aramaki ................. E04B 9/006 248/327
6,464,190 B1 * 10/2002 Aramaki ................. F21V 21/38 248/327
7,150,449 B1 * 12/2006 Dueck ...................... B62H 3/12 248/320
7,325,785 B2 * 2/2008 Krengel ................... A47B 5/00 211/17
7,575,098 B2 * 8/2009 Hartley ............... B66B 11/0005 187/261
7,841,448 B2 * 11/2010 Lair .......................... E06C 1/12 182/77
8,028,804 B2 * 10/2011 Lair .......................... E06C 1/12 182/77
9,572,427 B2 * 2/2017 Klooth ................... A47B 51/00
2012/0000865 A1 * 1/2012 Cangialosi ............ D06F 57/125 211/1.57

* cited by examiner

*Primary Examiner* — Bradley Duckworth
(74) *Attorney, Agent, or Firm* — Thompson & Knight LLP; Herbert J. Hammond

(57) ABSTRACT

A gravity descending and motorized ascending load carrying platform provides easy loading and installation underneath a ceiling. All mechanical and electrical components needed for operation of the platform travel with the platform. The mechanical components enable the platform to descend/ascend parallel to the floor, to hover parallel and over the floor when the platform supporting legs remain stored within its structure, to tilt when the cables on one side of the platform are under zero gravity force while the cables on the other side are still subjected to gravity force, to hover in a tilted position over the floor if the short supporting legs are not in contact with the floor while its long supporting legs are, to rest on its supporting legs whether in a position parallel to the floor or in a position forming a slope with the floor.

18 Claims, 11 Drawing Sheets

GRAVITY DESCENDING—MOTORIZED ASCENDING LOAD CARRYING PLATFORM

FIELD

The present invention relates to a load carrying platform that is adapted to travel vertically from underneath a ceiling to a floor and return to its original position or below it.

BACKGROUND

Platforms for storing packages, boxes, equipments, etc. . . . are often installed in the garages of private homes. There are essentially two types of platforms, one type is permanently installed on the walls or on the ceiling of the garage, while the other type is movable between an upward and a downward position. The drawback of the first type is that it requires a step ladder to access the platform for removal of storing items or for storing items. The second type is more attractive as an electric motor is driving the platform down for loading/unloading it, then the loaded platform can be raised by the same electric motor for driving it to a resting area. The resting area of these platforms is often above the garage ceiling which greatly complicates the technical configuration of the platform but also its installation, as an opening in the ceiling is required to let the platform go through. Making an opening in a ceiling can be challenging, in order to not affect its structural integrity. Additional drawbacks of the second type of prior art are due to added complexity of the platform residing in a specific apparatus required for maintaining the tension of the cables and provided above the ceiling, and risk of unwinding of the cables from their associated reels in case of failure of the sensor that stops the motor when the descending travel of the platform has been reached.

Consequently, there is a need to provide a platform for storing packages, boxes, equipments, etc. . . . that is simple, that does not need sensors for stopping its descending or ascending travel, that does not require complex systems provided above the ceiling for operating the platform, that can be tilted at the end of its descending travel for ease of unloading, and that is cost effective and easy to install.

SUMMARY

An aspect of the present invention overcomes the drawbacks of the prior art by providing a simple, safe and easy to install storage platform. An aspect of the invention relates to a load carrying platform that is adapted to travel vertically from underneath a ceiling to a floor and return to its original position or below it. The descending travel of the platform is gravity controlled while its ascending travel is motor driven. Gravity descent allows the load carrying platform to remain parallel to the floor during its descending travel, remain parallel to the floor at the end of its descending travel, or be either tilted to the floor or remain parallel to the floor at the end of its descending travel. The motor is configured to drive the platform in its ascending travel while, gravity only, is driving the platform in its descending travel. When gravity acting on all cables is equal to zero, the cables that support the platform no longer unwind even if the motor remains energized and rotating.

In particular, an aspect of the present invention relates to a load carrying platform system including a platform that is adapted to perform two vertical travels: A) a descending travel by gravity from underneath a ceiling to a floor and B) an ascending travel from a floor to underneath a ceiling via a motorized system. The platform is to be installed and hung, for example, underneath a garage ceiling and above a garage floor. The ceiling may be flat or of any type. The platform may be used to store packages, boxes, equipments . . . below the ceiling where it is installed. The platform can be of any shape. In an embodiment, the platform is rectangular and has a substantially planar base. The platform has an infinite number of steady positions between and including fully up to fully down positions. Loading the platform requires that it is brought from its up position to a down position. The gravity descending travel can be stopped either when fully down or at any convenient portion of the travel for ease of loading packages, boxes, equipments . . . . When the platform is loaded, its ascending travel, via a motor, can be stopped at any portion of the ascending travel, below the ceiling and not necessarily at the same position as when it started its descending travel. The top surface of the platform is adapted to carry and store packages, boxes, equipments . . . while its periphery carries its entire mechanical and electrical system. The platform is hung to the ceiling via a plurality of cables with, in an embodiment, one end of each cable engaging a dedicated turnbuckle that is secured to the ceiling structure while the other end of each cable is wound to a dedicated reel. The reels are mounted coaxially on a single shaft that is substantially longer than the width of the platform. The single shaft is located substantially in the middle length of the underneath of the platform, is supported by the lower side of the platform and the reels extend outwardly from the platform. The shaft is adapted to be driven by gravity during the descending travel of the platform and driven by a motorized system during the ascending travel of the platform. The motorized system is adapted to regulate the speed of gravity of the platform during its descending travel. The plurality of cables that support the platform, whether in a steady position or during its descending/ascending travel remain always under tension. When fully down, the platform is adapted to stay parallel to the floor and rest on its plurality of supporting legs of equal length, or, when fully down, the platform is adapted to be driven at an angle when it is resting on its plurality of supporting legs of unequal length. This last capability of the platform greatly eases the unloading of bulky packages as these would slide on the platform for easier reach/removal. When gravity is equal to zero, because the platform is fully down and resting on its legs, whether of equal or unequal length, the plurality of cables that have driven the platform down do not unwind from their reels even if the motorized system continues to be energized and to rotate.

The structure of the platform is simple in its design and configured to be easily installed. In an embodiment, the structure is made of extruded aluminum. It is composed of an extruded aluminum frame which cross section is constant and configured to receive/support all of the mechanical and electrical systems of the platform as well as to support the ribs for supporting the floor of the platform where the packages, boxes, equipments . . . are stored. For additional ease of installation of the platform its electrical system is adapted to connect to a current input source at any peripheral side of its extruded frame. The descending/ascending travel can be controlled wirelessly or via a hard routed electrical circuit that encompasses a 3 position toggle switch, for example.

In an aspect of the invention, there is provided a load carrying platform system, comprising a movable platform for transporting an object between a first level and underneath a vertically-elevated second level; a rotatable shaft mounted to the movable platform so that the rotatable shaft moves vertically with the movable platform; a plurality of cables each fixed at a first end to the vertically-elevated second level and at a second end to the rotatable shaft; a motor gear reducer assembly that includes a motor and a gear reducer, the motor gear reducer assembly mounted to the movable platform so that the motor gear assembly moves vertically with the movable platform; a freewheel coupled to the motor gear reducer assembly in a manner that, when the motor is energized, the motor gear reducer assembly controls a rotation of the freewheel in a first rotational direction corresponding to a vertical ascending movement of the movable platform toward the vertically-elevated second level and the rotation of the freewheel in a second rotational direction that is opposite the first rotational direction, wherein the freewheel is mounted to the rotatable shaft in a manner that, during rotation of the freewheel in the first rotational direction by the motor, the freewheel is locked to the rotatable shaft so that the freewheel and the rotatable shaft rotate in unison and the freewheel forces the rotatable shaft to rotate in the first direction and wind up the cables around the shaft and, during rotation of the freewheel in the second rotation direction by the motor, the freewheel is freely rotatable around the rotatable shaft so that the movable platform follows a vertical descending movement solely under the action of gravity, thereby permitting, during the vertical descending movement, that a length of a portion of a first cable of the plurality of cables, that is unwound from the rotatable shaft, be different from a length of a portion of a second cable of the plurality of the cables, that is unwound from the rotatable shaft.

In an embodiment, the speed of rotation of the rotatable shaft corresponding to the vertical descending movement of the movable platform is controlled by a gear ratio of the motor gear reducer assembly.

In an embodiment, the vertically-elevated second level defines a ceiling and wherein the first end of each of the plurality of cables is attached at the ceiling or at a position below the ceiling.

In an embodiment, the movable platform is retained by the vertically-elevated second level only via the plurality of cables so that the movable platform is movable only between the first level and a position underneath the vertically-elevated second level.

In an embodiment, the load carrying platform system includes a slack removal mechanism configured to remove a slack of one or more of the plurality of cables during a tilted vertical descending movement of the movable platform during which the movable platform is tilted relative to a horizontal plane formed by the first level.

In an embodiment, the slack removal mechanism includes a spring-loaded arm coupled to the movable platform, the spring-loaded arm including a guide configured to guide the one or more of the plurality of cables, the spring-loaded arm being movable between (a) a first position corresponding to the vertical ascending movement of the movable platform or the vertical descending movement of the movable platform during which the movable platform is parallel to the horizontal plane and (b) a second position corresponding to the tilted vertical descending movement of the movable platform.

In an embodiment, the spring-loaded arm is automatically positioned in the second position with a spring during the tilted vertical descending movement of the movable platform.

In an embodiment, the load carrying platform system includes a plurality of movable legs connected to the movable platform, the plurality of movable legs configured to support the movable platform on the first level.

In an embodiment, each of the plurality of movable legs is movable between a first position in which the movable leg is substantially retracted within the movable platform and a second position in which the movable leg extend away from the movable platform.

In an embodiment, at least one of the movable legs has a length that is shorter than another one of the movable legs so that the movable platform is titled relative to the horizontal plane when the movable legs support the movable platform on the first level.

In an embodiment, the motor gear reducer assembly, the rotatable shaft and the freewheel are arranged underneath the movable platform.

In an embodiment, the rotatable shaft is provided substantially at a center of the movable platform.

In an embodiment, the load carrying platform includes a movable trigger extending below the movable platform, the movable trigger configured to de-energize the motor when actuated.

In an embodiment, the vertical descending movement of the movable platform is only effected by gravity.

In an embodiment, the load carrying platform further includes a plurality of reels provided at each end of the rotatable shaft and co-axially with a longitudinal axis of the rotatable shaft.

In an embodiment, each of the plurality of cables is attached to a different one of the plurality of reels.

In an embodiment, the plurality of reels is four and the plurality of cables is four.

In an embodiment, portions of all of the plurality of cables, that are unwound from the rotatable shaft, have equal length during the vertical descending movement of the movable platform.

DETAILED DESCRIPTION

In the following detailed description, reference is made to the accompanying drawings, which form a part hereof and are shown to illustrate specific embodiments in which the invention may be practiced. These embodiments are described in sufficient details to enable those skilled in the art to practice the invention. It is understood that other embodiments may be utilized without departing from the spirit or scope of the invention. To avoid details not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
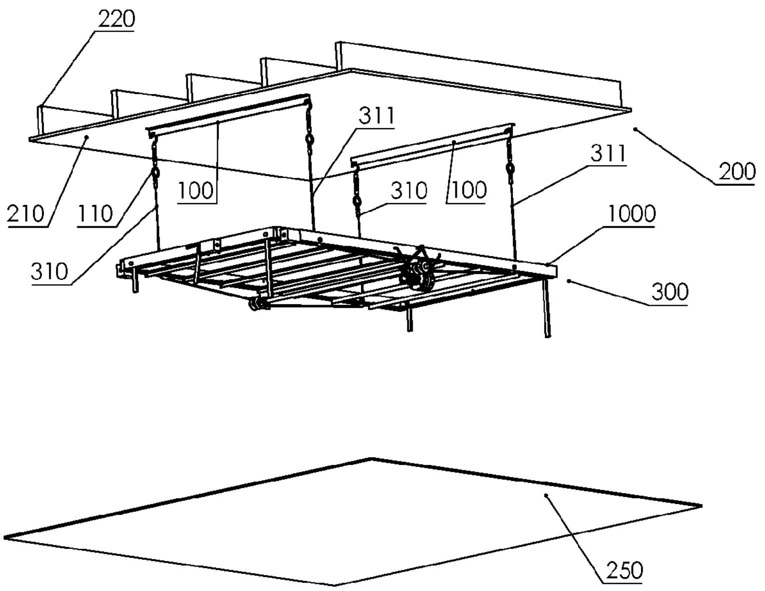
FIG. 1 is a perspective view of the platform in its upward position in accordance with an embodiment of the invention.

With reference to FIG. 1, a load carrying platform system 300 according to an embodiment of the invention is described. As will be explained hereinafter, the load carrying platform system 300 is beneficial as it does not require the installation of an opening in a ceiling or the presence of complex mechanisms (like tension cables, electric cables, mechanical systems, motor, . . . ) provided above the ceiling to operate the system 300. Moreover, in contrast with conventional products, the load carrying platform system 300 can be installed in any type of ceiling. Furthermore, the load carrying platform system 300 is a self-contained system as substantially all of its mechanical and electric systems, including the motor, are part of the moveable platform. As shown in FIG. 1, the load carrying platform system 300 includes a platform 1000 that is hanging in a resting position to a ceiling 200 and above a floor 250. The ceiling 200, known in the construction business, has sheet rocks 210 attached to a plurality of joists 220. The load carrying platform system 300 further includes a plurality of platform cables 310, 311 that secure the platform 1000 to the ceiling 200. In an embodiment, two aluminum angles 100 are mechanically secured to the ceiling 200 via a plurality of lag screws (not shown) going through the sheet rocks 210 and screwed to the joists 220. Each angle 100 is configured with a plurality of holes for engagement of S-hooks or turnbuckles 110 on which one end of the platform cables 310 and 311 is secured. The use of a turnbuckles 110 arrangement is desirable as it allows the leveling of the platform 1000 once it is hanging.

Figure 6:
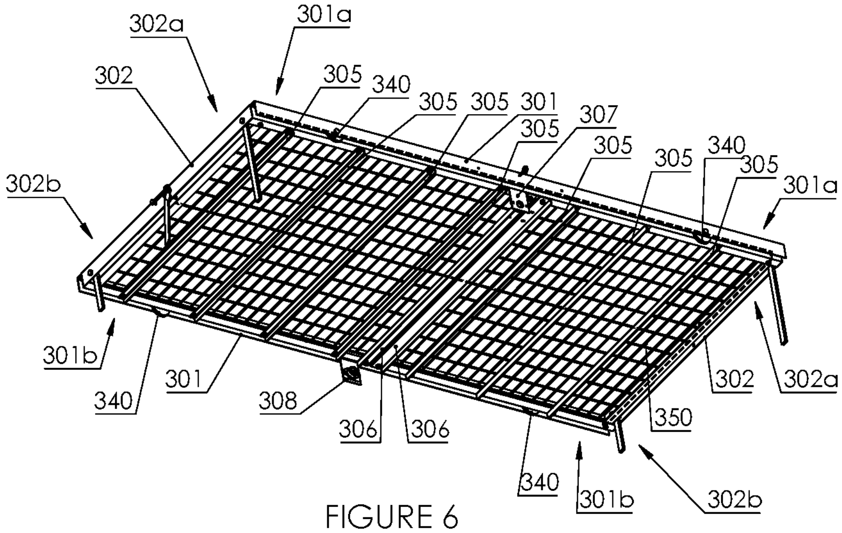
FIG. 6 is a perspective view of the structure of the platform shown from underneath it in accordance with an embodiment of the invention.
Figure 7:
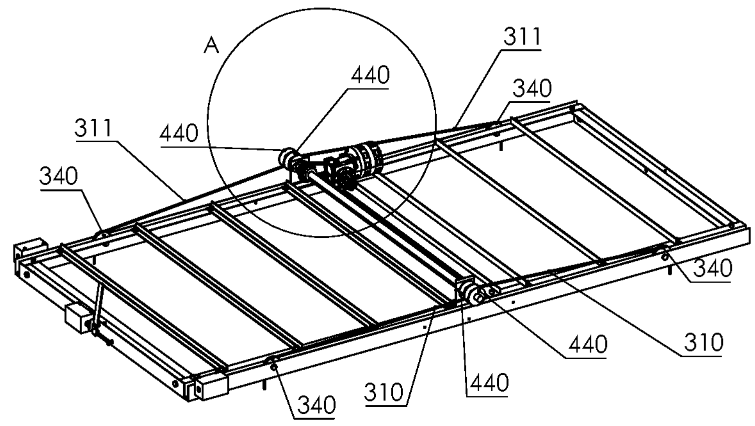
FIG. 7 shows the mechanical configuration of the platform in accordance with an embodiment of the invention.

The platform 1000 is suspended underneath a ceiling 200 via the plurality of cables 310, 311. Each cable 310, 311 has one of its extremity secured to a dedicated turnbuckle 110 (FIG. 1) while its other extremity is secured to a dedicated reel 440 mounted coaxially to a shaft 400 (FIG. 7). The cables 310, 311 are selected so that the platform 1000 can carry a load of at least 700 pounds. However, this is not limiting. As will be appreciated by one skilled in the art, the cables can be selected to carry a load that is substantially greater than 700 lbs or less than 700 lbs. The dedicated reels 440 and shaft 400 are arranged on the platform 1000, as will be explained in detail hereinafter (see FIGS. 7, 7*a*). For supporting of the platform 1000, each cable 310, 311 engages a dedicated sheave 340 (FIGS. 6, 7) that is pivotally mounted and housed by the skeleton of the platform 1000. The load carrying platform system 300 further comprises a plurality of supporting legs 330, 331 that are pivotally mounted on the platform 1000 (see FIGS. 2*a* and 3). The plurality of supporting legs 331 are shorter than the supporting legs 330. In an embodiment, the supporting legs 330, 331 are manually movable between a retracted position in which the supporting legs 330, 331 remain stored within the platform 1000, in a substantially horizontal position, and an extended position in which the supporting legs 330, 331 are positioned in a substantially vertical position. In an embodiment, the legs 330, 331 are maintained in their storage position or their extended position via a bolt (not shown), for example, that goes through the walls of the supporting frame of the platform. In this manner, the legs 330, 331 are resting on the bolt when they are in their storage position or are prevented from returning to their storage position when they are extended. The recitation "substantially in a horizontal position" is intended to cover configurations in which the supporting legs 330, 331 define an angle between 0° and 20° relative to the horizontal plane. Likewise, the recitation "substantially in a vertical position" is intended to cover configurations in which the supporting legs 330, 331 define an angle between 0° and 20° relative to the vertical plane. The supporting legs 330, 331 can be made with extruded aluminum or with any other material that provides sufficient strength to support the entire assembly including the platform 1000, the motor, gear reducer, the load supported by the platform 1000 . . . when the platform 1000 is in its downward position.

Figure 2:
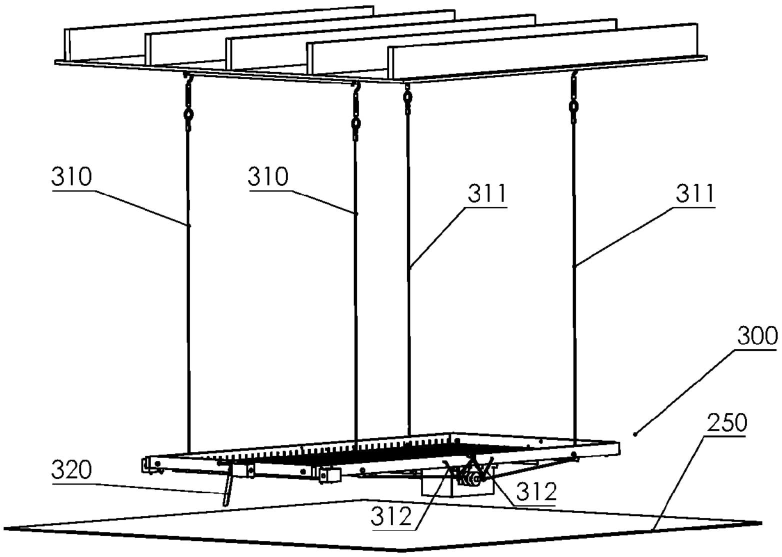
FIG. 2 is a perspective view of the platform in its downward position with its supporting legs stored in accordance with an embodiment of the invention.
Figure 2A:
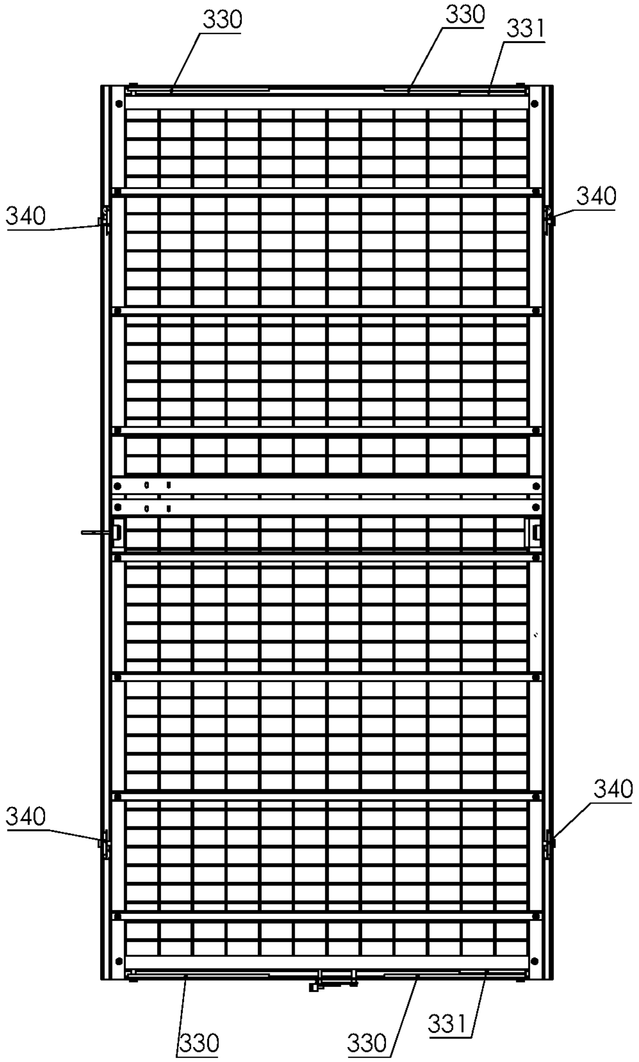
FIG. 2*a* shows the supporting legs of the platform in their storage position in accordance with an embodiment of the invention.

With reference to FIG. 2, the load carrying platform system 300 further comprises a pivoting arm 320, which acts as a trigger for a switch to de-energize the motor provided on the platform. In FIG. 2, the operator has controlled electrically the platform 1000 to its downward position and since its supporting legs 330, 331 have remained stored within the platform 1000 (FIG. 2*a*), the operator has stopped the electric control of the gravity descent before the platform 1000 reaches the floor 250. The pivoting arm 320 has not contacted the floor 250 and consequently has not de-energized the control system of the gravity descending travel. In this position, the force of gravity is still acting on the cables 310, 311 of the platform 1000: the platform 1000 is parallel to the floor 250, is retained by its cables 310, 311 and is hovering parallel to and over the floor 250. The cables 310, 311 have all the same length, are under tension due to the gravity force. As further described in detail, the platform 1000 is safely locked in this position. In this position the platform 1000 can swing a little during the unloading/loading process.

Figure 2B:
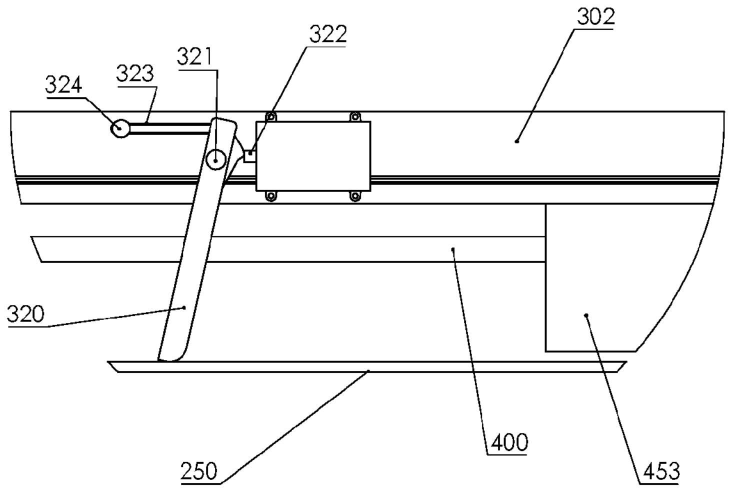
FIG. 2*b* shows the triggering of the switch that opens the gravity descent circuit in accordance with an embodiment of the invention.

Still with reference to FIG. 2, if the operator had not stopped the electric control of the gravity descent, the platform 1000 would have continued its gravity descent until its spring loaded pivoting arm 320 contacts the floor 250. During that descending movement, the platform 1000 remains parallel to the floor 250 and portions of all of the plurality of cables, that are unwound from the rotatable shaft 40, have equal length. The arm 320 is spring loaded via a spring 323 (schematically represented) that has one extremity secured to the arm 320 and the other extremity secured to an anchoring point 324 on the platform 1000. The mechanical arrangement of the arm 320 (FIG. 2*b*) is such that the floor 250 forces the arm 320 to pivot around its axis 321 for triggering a switch 322 (mounted on the platform 1000) that opens the electric circuit of the gravity descent, hence de-energizing it. The control circuit of the gravity descent is automatically de-energized. The force of gravity is still acting on the cables 310, 311 that support the platform 1000: the platform 1000 is parallel to the floor 250, is retained by its cables 310, 311 and is hovering parallel to and over the floor 250. All the cables 310, 311 have equal length. This arrangement is very useful for the cases where the platform 1000 is installed above a garage door. For such installation, when the garage door is opened, the arm 320 would contact the outside surface of the garage door which in turns would force the arm 320 to pivot around its axis 321 for triggering the switch 322 that opens the circuit of the gravity descent: the platform 1000 is retained by its cables 310, 311 and is hovering over the garage door without applying any weight to it.

Figure 3:
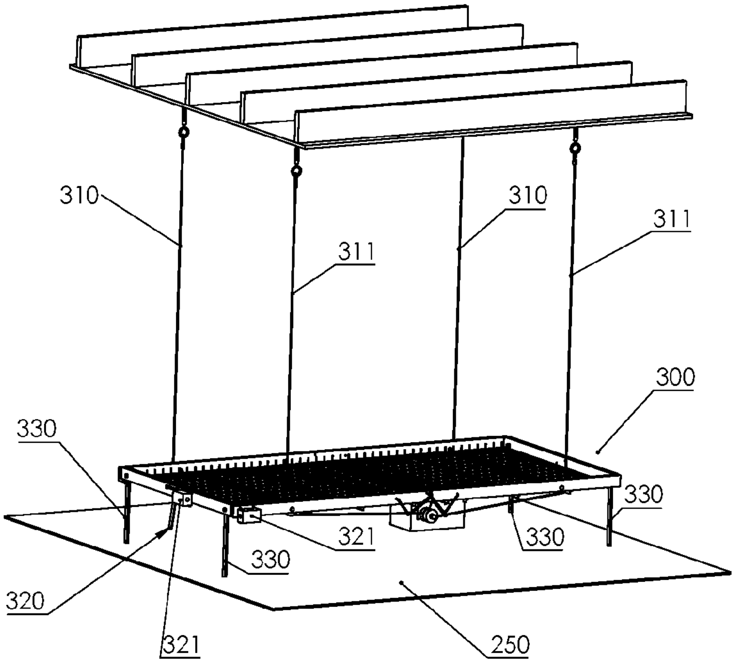
FIG. 3 is a perspective view of the platform in its downward position and resting on its legs of equal length in accordance with an embodiment of the invention.

With reference to FIG. 3, the platform supporting legs 330 of equal length have been positioned out of their storage area to allow the platform 1000 to rest on them when it is in its full downward position. It is to be noticed that the length of legs 330 are longer than the length of arm 320 so that when the legs 330, 331 are reaching floor 250, the arm 320 cannot trigger the switch 322 that opens the gravity descent circuit. In such position, the platform 1000 is steady on its legs 330 of equal length and parallel to the floor 250, the force of gravity acting on the cables 310, 311 is equal to zero, and although the electric circuit that controls the gravity descent may still be energized, the cables 310, 311 have stopped to unwind from their respective reels 440. This feature is very beneficial as it allows one to control the gravity descent either parallel to the floor 250 or at an angle as will be described hereunder. All the cables 310, 311 have equal length.

Figure 4:
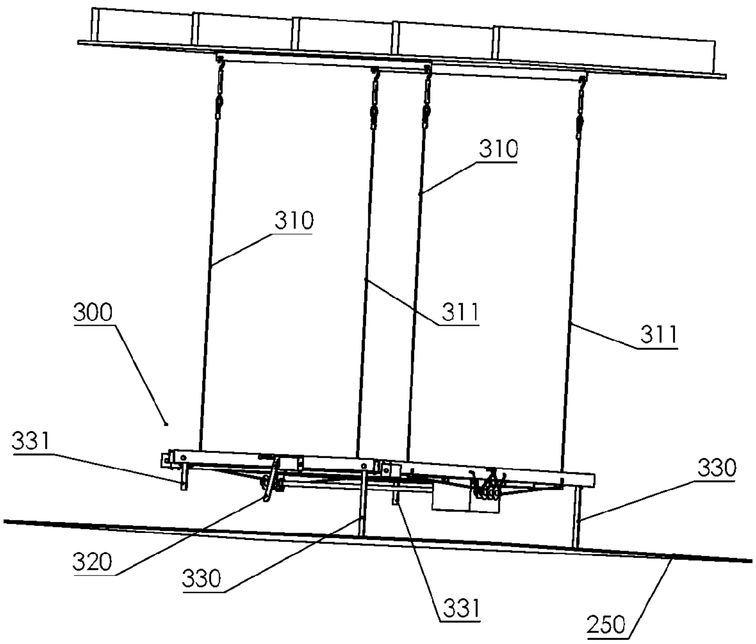
FIG. 4 is a perspective view of the platform with its longer legs resting on the floor and its shorter legs away from the floor in accordance with an embodiment of the invention.

With reference to FIG. 4, the platform supporting legs 330 and 331, of unequal length, have been positioned out of their storage area to allow the platform 1000 to rest on them when it is in its full downward position. It is to be noticed that the legs 331 are shorter than legs 330. There are at least two legs 330 of equal length pivotally mounted in the vicinity of both ends 302*a*, 302*b* of each lateral side 302 of the platform 1000 and at least two legs 331 shorter than legs 330 and pivotally mounted in the vicinity of one end only 302*b* of each lateral side 302 of the platform 1000 (FIG. 6). Alternatively, the legs 330 can be mounted in the vicinity of both ends 301*a*, 301*b* of each longitudinal side 301 of the platform 1000 and the legs 331 can be mounted in the vicinity of both ends 301*b* of only one longitudinal opposite side 301 of the platform 1000.

When the platform 1000 started its gravity descending travel, it travels parallel to the floor 250 until the longer supporting legs 330 reach the floor 250. In this position, FIG. 4, the platform 1000 is parallel to the floor 250 and its shorter supporting legs 331 are away from the floor 250. Because one end 302*a*, 302*b* of both lateral sides 302 of the platform 1000 has its supporting legs 330 resting on the floor 250, the force of gravity acting on cables 311 is now equal to zero on this side 302*a* only, but not on the opposite side 302*b* where the shorter legs 331 are mounted: the force of gravity is still acting on cables 310. Consequently the force of gravity acting on cables 310 generates a pivoting of the platform substantially around the longitudinal edge 301 of zero force of gravity (the platform longitudinal edge that is on the side of the long legs 330) until the shorter legs 331 reach the floor 250 as shown on FIG. 4*a*.

In such position, the platform 1000 is steady on its supporting legs 330, 331 of unequal length, the platform 1000 is resting at an angle to the floor 250, the force of gravity acting on the cables 311 and now 310 is equal to zero, and although the electric circuit that controls the gravity descent may still be energized and rotating, the cables 310, 311 have stopped to unwind from their respective reels 440. The cables 311 on the side 302*a* of the long supporting legs 330 are shorter (as measured from their end connected to the turnbuckle to the shaft 400) than the cables 310 on the side 302*b* of the short supporting legs 331. Specifically, a length of a portion of cables 310, that is unwound from the rotatable shaft 400, is different from a length of a portion of cables 311, that is unwound from the rotatable shaft 400. However, the cables 310, 311 remain in a straight vertical position. The reaching of this position, a significant characteristic of this aspect of the invention, is only possible thanks to the control of the force of gravity that is acting on cables 310 and 311.

At this point the platform 1000 is tilted from the floor 250 and resting on all of its legs 330, 331: the gravity force acting on all cables is now equal to zero. The tilt of the platform 1000 relative to the floor 250 can be adjusted by modifying the respective lengths of the legs 330, 331. In an embodiment, the legs 330, 331 have fixed length so that the tilting angle be in a range of up to 25 degrees. In another embodiment, the supporting legs 330 or 331 can be telescopic. The cables 310 and 311 have stopped unwinding from their reels 440 although the electric circuit that controls the gravity descent may still be energized.

At the point when the supporting legs 330 get in contact with the floor 250, and the platform 1000 is parallel to the floor 250, the force of gravity acting on cables 311 is equal to zero on the side 302*a* of the platform 1000 where the legs 330 are installed and are in full effect on cables 310 on the side 302*b* where the shorter supporting legs 331 are installed. Thus, because the force of gravity is still acting on cables 310, that are supporting the platform 1000, even on one side 302*b* only of the platform 1000, the electric control of the gravity descent is still on and the cables 310 and 311 are keeping on unwinding from their respective reels 440. Due to the force of gravity, the cables 310, on the side 302*b* of the short supporting legs 331, are unwinding from their reels 440 with no slack. The cables 311, on the side 302*a* of the long supporting legs 330, are also unwinding although the force of gravity is equal to zero on this side 302*a*. The cables 311 continue to unwind from their reels 440 because, and as is described later in further details, the reels 440 for cables 310 and 311 are mounted on a common driving shaft 400. The shaft 400 is rotating in the descending direction because of the force of gravity that is acting on cables 310 on the side 302*b* of the short supporting legs 331 is driving it. Consequently, the cables 310 drive their dedicated reel 440 which in turn drive the shaft 400 which in turn drives the reels 440 of cables 311, unwinding them. If no precautions were taken, the cables 311 would have slack as they continue to unwind when the platform 1000 starts its tilting from the position shown in FIG. 4.

Figure 4A:
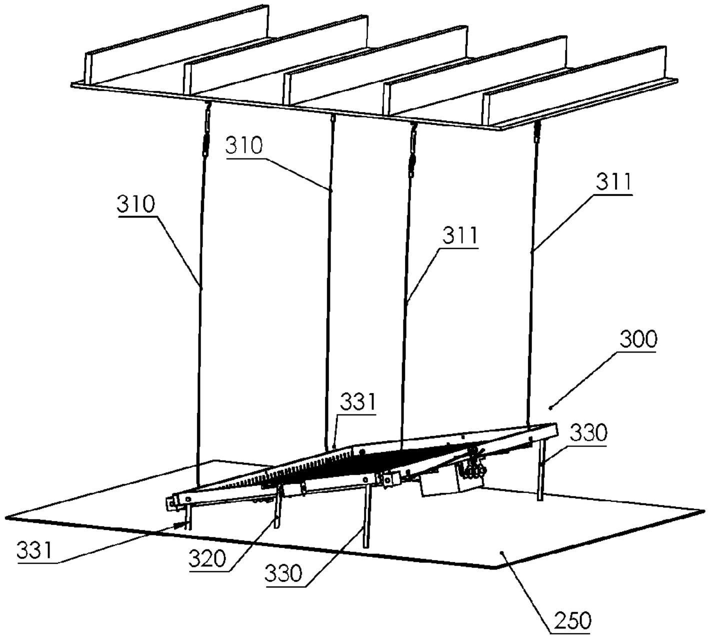
FIG. 4*a* is a perspective view of the platform in its downward position and resting on its legs of unequal length in accordance with an embodiment of the invention.

It is a significant characteristic of an aspect of the invention that a system or mechanism is provided for removal of the slack of cables 311 when the platform 1000 initiates and finishes its tilting, from its parallel position to the floor 250 shown in FIG. 4 to its tilted position shown in FIG. 4*a* or returns from its tilted position (FIG. 4*a*) to its parallel position to the floor (FIG. 4). The mechanism, described hereunder, for removal of the slack of cables 311 is only effective when the platform 1000 starts its tilting and until it is fully tilted, i.e., when its short supporting legs 331 are in contact with floor 250, and also when the platform 1000 starts its ascending travel from its tilted position to its parallel position.

Figure 5:
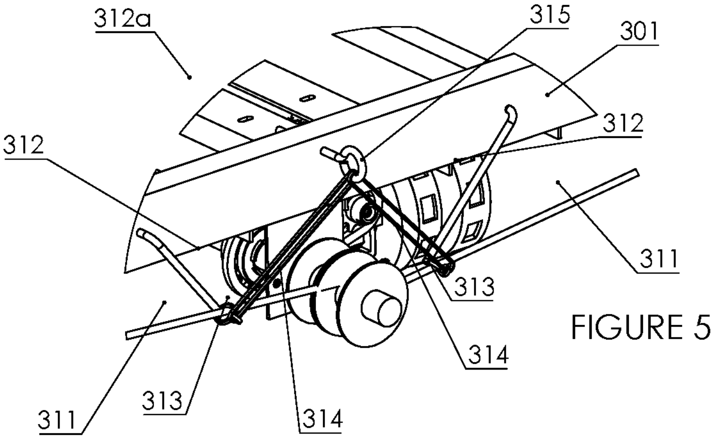
FIG. 5 is a detailed view of the position of the pivoting arms when the platform travels parallel to the floor (resting or not on its supporting length of equal length) or when the platform is hovering over the floor in accordance with an embodiment of the invention.

With reference to FIG. 5, the slack removal mechanism 312*a* of cables 311 includes a dedicated arm 312, per cable, pivotally mounted on the frame 301 (FIGS. 5, 5*a*, 6) of the platform 1000. The slack removal mechanism 312*a* acts as a tension mechanism configured to maintain tension in the cable 311. Each arm 312 is spring loaded mounted as shown schematically on FIG. 5, by a spring system 314 (e.g. a spring having the form of a coil or an elastic) that has one of its end attached to the arm 312 and the other end attached to a fixed point 315, eyebolt or similar, on frame 301. Each arm 312 has a guiding finger 313 for guidance of the cables 311 when the platform 1000 moves from its parallel position to the ground 250 to a tilted position to the ground 250 (descending travel) or from its tilted position to the ground 250 to a parallel position to the ground 250 (ascending travel). The pivoting arms 312 have two modes of operation: a non-operational mode and an operational mode.

The pivoting arms 312 are automatically placed either in a non-operational mode by the cables 311 or in an operational mode by their dedicated spring 314. The non-operational mode corresponds to the parallel descending or ascending travel of the platform 1000 to the floor 250. In FIG. 5, as well as for any ascending or descending platform 1000 travel parallel to the floor 250, the cables 311 unwind or rewind with no slack because of the force of gravity acting on them. When the platform 1000 is traveling parallel to the floor 250, the spring loaded arms 312 have no effect on the cables 311 because the forces that are reacted by the cables 311 under the weight effect of the platform 1000 with or without cargo, far exceeds the arms spring force capability. The cables 311 are forcing the arms 312 via their guiding finger 313 to remain in their non-operative mode.

Figure 5A:
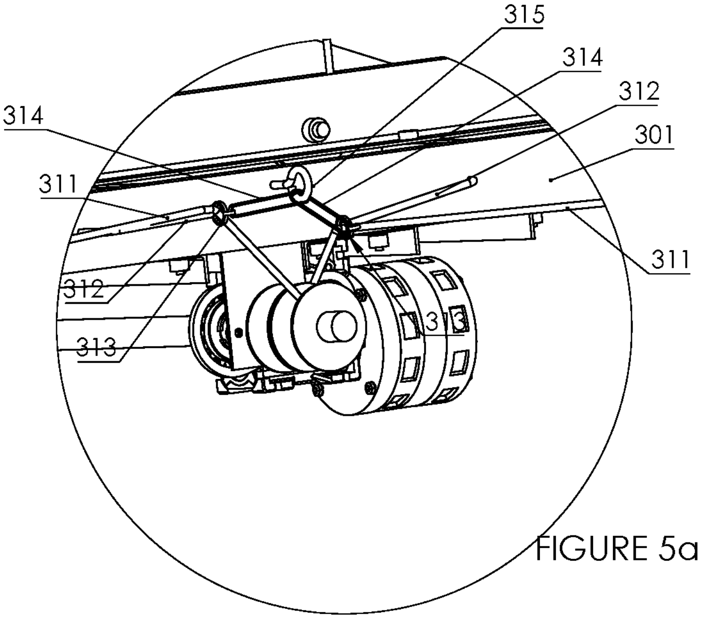
FIG. 5*a* is a detailed view of the pivoting arms that allow the positioning of the platform at an angle when resting on its legs of unequal length in accordance with an embodiment of the invention.

With reference to FIG. 5*a*, the force of gravity on the side of the legs 330 is now equal to zero because the legs 330 are now in contact with the floor 250 (FIG. 4). Because there is now no force of gravity acting on cables 311, a slack (FIG. 5*a*) in the cables 311 is generated during the descending travel of the platform 1000 from its parallel position to the floor 250 (FIG. 4) to its tilted position (FIG. 4*a*). During such travel, the slack generated in cables 311 is continuously removed by the spring loaded pivoting arms 312 via their guiding fingers 313 that pull away the slack of cables 311. This is the operational mode of the pivoting arms 312.

The pivoting arms 312 are continuously removing the slack generated in cables 311 until the short supporting legs 331 contact the floor 250. At such point, the force of gravity acting on all cables 310, 311 is equal to zero, and although the electric circuit of the gravity descent may still be on, the cables 310, 311, as will be described later, can no longer unwind from their respective reels 440.

The capability of positioning the platform 1000 to a tilted position is a significant characteristic of an aspect of the invention as it greatly helps the operator to unload/load bulky cargo from the platform 1000.

When the platform 1000 is commanded to start its ascending travel from its tilted position and resting position of FIG. 4*a*, the shaft 400 on which mount the reels 440 of cables 310, 311 starts its rotation driving all reels 440 in the winding direction. On the side 302*b* of the short supporting legs 331, as the legs 331 start to go away from the floor 250, the force of gravity is applying tension to cables 310, no slack, and the cables 310 start to wind on their respective reels 440.

On the opposite side 302*a*, i.e., the side of the long supporting legs 330, the spring force exerted by the springs 314 on the pivoting arms 312 continue to exert some tension in the portion of the cables 311 with slack while the winding of the slack portion of cables 311 forces the arms 312, by the force the cables 311 apply on the guiding fingers 313, to return progressively to their non-operative mode. Consequently the slack on cables 311 is progressively removed during the ascending travel of the platform 1000 from its tilted position to a parallel position to the ground while the cables 310 and 311 are efficiently winding on their respective reel 440. The slack on cables 311 is completely eliminated when the platform 1000 has returned to a parallel position to the floor (FIG. 4), and at such point the pivoting arms 312 have returned to their non-operative mode (FIG. 5). The platform 1000 can continue its ascending travel towards the ceiling 200, its cables 310, 311 being subjected to the force of gravity. The control of the ascending travel of the platform 1000 can be stopped at any position during its ascending travel.

The springs force required to position the arms 312 from their non-operative mode to their operative mode is little as it only requires to be capable of removing the slack from the cables 311 that have no tension in them because at that point the force of gravity acting on these cables is equal to zero.

While FIGS. 5, 5*a* show a specific schematic of the springs 314 acting on the arms 312 with one single anchor 315 located between the arms, other embodiments are possible without departing from the spirit of the invention. For example each of the arms 312 could have its pivot fitted with a torsion spring; this would eliminate the anchor 315 of the springs. In another embodiment, rather than having a single anchor 315 between the arms 312, each spring 314 could have its specific anchor 315 located either between the pivots of each arms 312 or outside of the area between the two arms 312.

FIG. 5 shows that the pivoting arms 312 have a guiding finger 313 in the form of a ring through which the cables 311 are passing through for guidance of cables 311 when the arms 312 move between their two positions. In effect, each pivoting arms 312 can have a single straight finger on which the cable 311 would rest. The finger is the guide of the cables 311. In their non-operational mode, the pivoting arms 312 are in position shown in FIG. 5, the cables 311 are resting on their respective finger. The force of gravity acting on cables 311 is far greater than the spring forces acting on the arms 312, and because there is no slack in the cables 311, the straight guiding finger cannot raise the cables 311. The force of spring 314 maintains the finger against the cables 311. In the operational mode of arms 312, the straight finger of the spring loaded pivoting arms 312 lifts up the slack of the cables 311, substantially removing it (travel of the platform from FIG. 4 to FIG. 4*a*). When the platform 1000 starts its ascending travel from the position shown in FIG. 4*a* to the position shown in FIG. 4, the motor rewinds the cables 310, 311 on their respective reels 440. It is the rewinding of the slack of cables 311 that applies a sliding force on the straight finger of the arms 312 forcing them to return to their non-operative mode. At this point, the slack of cables 311 is totally removed and the gravity force that is acting on the cables 311 maintain the pivoting arms 312 in their non operative mode.

Figure 6A:
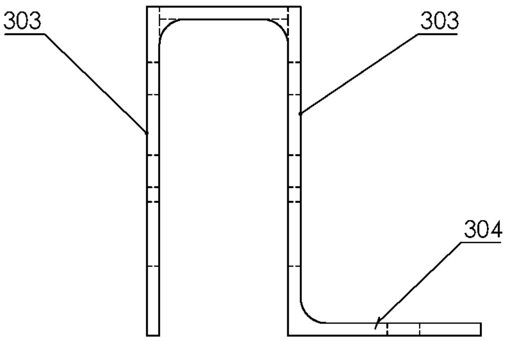
FIG. 6*a* is a cross section of the peripheral framing of the platform in accordance with an embodiment of the invention.

With reference to FIG. 6, the peripheral skeleton of the platform 1000 is an assembly composed of two opposite frames 301 and two opposite frames 302. Frames 301 and 302 are identical in cross section (FIG. 6*a*). In an embodiment, the frames 301, 302 are made of extruded aluminum but can also be made of any other material like composite for example. While FIG. 6 shows that frame 301 is longer than frame 302, leading to having a rectangular platform 1000, both frames 301 and 302 could have the same length for having a square platform 1000. Moreover, while the platform 1000 is shown as being substantially planar in the figures, it is envisioned that the platform 1000 could have different shapes, including a curved bottom shape. for accommodating specific shape of stored items. As shown in FIG. 6*a*, the cross section of the frames 301, 302 is configured to house a plurality of the platform mechanical components (sheaves, supporting legs . . . ) between its vertical walls 303, while its lips 304 supports a plurality of ribs 305, at least two ribs 306 and at least two bearing support 307. In an embodiment, ribs 305, 306 and bearing support 307 are made of aluminum but can also be made of any material, composite for example. The mechanical assembly of the frames 301, 302 between themselves, the ribs 305, 306 and the bearing support 307 to the frames 301, 302 can be of any type known in the art for the material selected, i.e., riveted, bolted, welded. The opposite frames 302 of the platform 1000 support the landing legs 330, 331 and house them within their walls 303. The lip 304 of frames 301, 302 forms a peripheral landing for supporting the peripheral edges of a grid 350 while the plurality of ribs 305, 306 support the entire surface of the grid. Without departing from the spirit of the invention, the grid 350 can be replaced by a solid surface, like thin plywood, composite lamina, thin metallic sheet . . . etc, all of these being adequate for supporting the cargo that will be stored on the platform.

With reference to FIG. 7 the mechanical components of the platform 1000 are all installed on and travel with the platform 1000. The mechanical components enable the platform 1000 to descend/ascend parallel to the floor 250, to hover parallel and over the floor 250 when the platform supporting legs 330, 331 remain stored within its structure, to tilt when the cables 311 on one side of the platform 1000 are under a zero gravity force while the cables 310 on the other side are still subjected to the gravity force, to hover in a tilted position over the floor 250 if the short supporting legs 331 are not in contact with the floor 250 while its long supporting legs 330 are, to rest on its supporting legs 330, 331 whether in a position parallel to the floor 250 or in a position forming a slope with the floor 250. As is described hereunder, the mechanical arrangement of this aspect of the invention allows the stopping of the unwinding of the cables 310, 311 when the force of gravity acting on them is equal to zero, even though the electric gravity descent control is still running and the motorized system rotating.

Figure 7A:
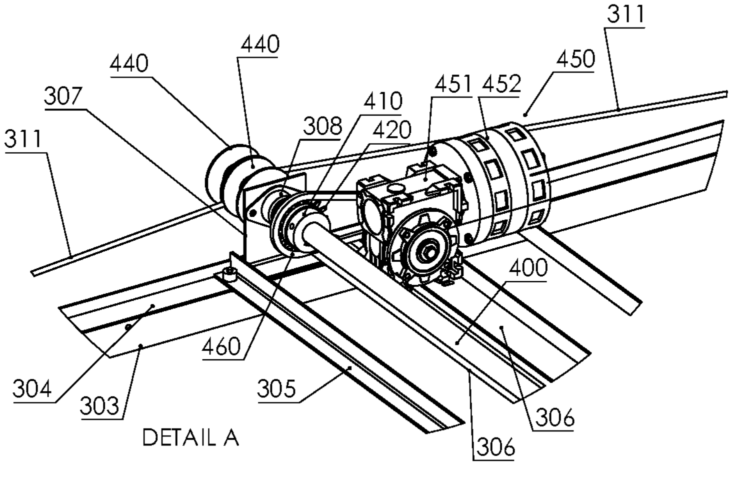
FIG. 7*a* is a detailed view of the motor assembly of FIG. 7 in accordance with an embodiment of the invention.
Figure 7B:
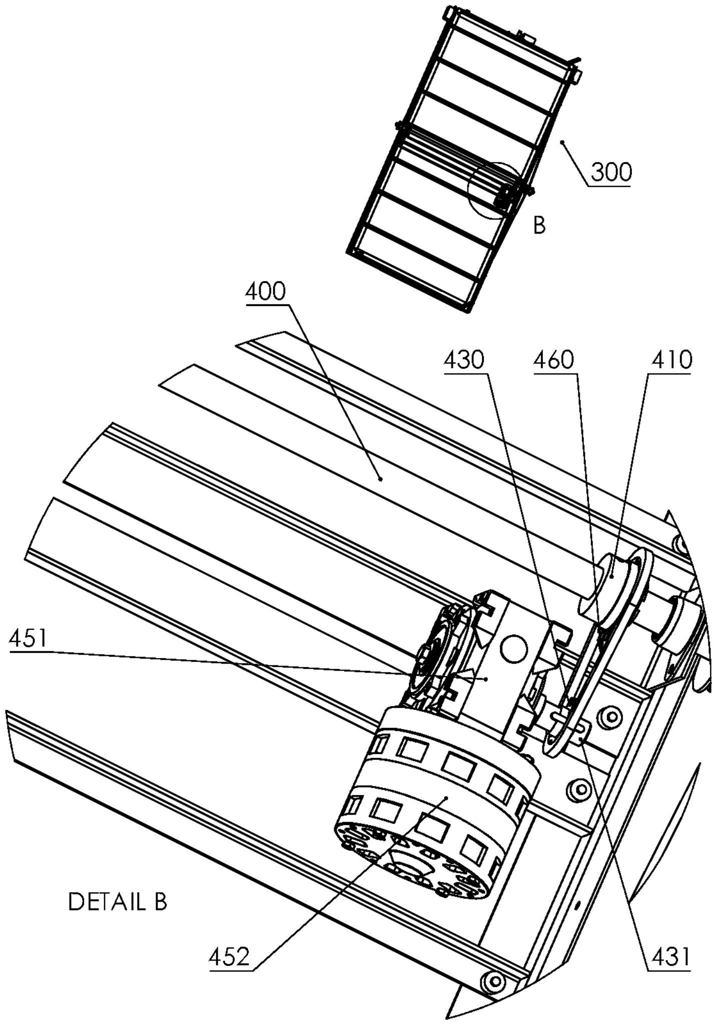
FIG. 7*b* is another detailed of the motor assembly of the platform in accordance with an embodiment of the invention.

With reference to FIGS. 7*a*, 7*b*, the mechanical components of the load carrying platform system 300 are composed of a shaft 400, a freewheel adapter 410, a freewheel 420, a motor gear reducer assembly 450 that comprises a motor 452 and a gear reducer 451, a sprocket 430, a chain 460 and at least four reels 440. In an embodiment, two coaxial reels 440 are positioned on opposite side of the shaft 400. Each reel 440 is connected to one of the four cables 310, 311. For example, two coaxial reels 440 provided at one end of the shaft 400 are each connected to a separate cable 310, whereas two other coaxial reels 440 provided at another (opposite) end of the shaft 400 are each connected to a separate cable 311. The shaft 400, reels 440, freewheel adapter 410, freewheel 420, and the motor gear reducer assembly 450 that comprises motor 452 and gear reducer 451, sprocket 430, and chain 460 are all provided underneath the platform 1000 to maximize the storage area of the platform 1000. Without departing from the spirit of this invention parts or all of the mechanical components could be installed above the platform 1000. The figures show that the shaft 400 is positioned substantially at a central position of the platform 1000, between the two opposite frames 302. Without departing from the spirit of this invention, the shaft and all of its associated system can be positioned at any location between and parallel to the two opposite frames 302. of the platform 1000. In an embodiment, the shaft 400 may be provided, from the center of the platform 1000, within a range that is less than 20%, for example less than 10%, even less than 5%, of the longitudinal length of the platform 1000. In an embodiment, the shaft 400 is provided at the center of the platform 1000. The freewheel 420 (also referred to as overrunning clutch) is a known mechanism that includes two parts: a first part that is rotatable relative to a second part (e.g. attached to a shaft). The first part and the second part are locked to each other when the first part rotates in a first rotational direction so that the first and second parts rotate in unison. In the opposite second rotational direction, the first part freely rotates relative to the second part. The first part of the freewheel may include an outer saw-toothed wheel for engaging to a chain. The freewheel permits the outer saw-toothed periphery of the freewheel 420 to be disengaged from the rotatable shaft 400 when the outer saw-toothed periphery of the freewheel 420 is rotated in the second rotational direction and to engage the rotatable shaft 400 when the outer saw-toothed periphery of the freewheel 420 is rotated in an opposite first rotational direction so that the outer saw-toothed periphery of the freewheel 420 and the rotatable shaft 400 rotate in unison. The freewheel 420 can include a ratcheting freewheel mechanism. This arrangement is beneficial because it permits the platform 1000 to follow a vertical descending movement solely under the action of gravity, thereby permitting, during the vertical descending movement, that a length of a portion of a first cable 310 of the plurality of cables, that is unwound from the rotatable shaft 400, be different from a length of a portion of a second cable 311 of the plurality of the cables, that is unwound from the rotatable shaft 400. As will be explained hereinafter, a speed of rotation of the rotatable shaft corresponding to the vertical descending movement of the movable platform is controlled by a gear ratio of the motor gear reducer assembly.

The shaft 400 is adapted to rotate in a first rotational direction of rotation that provides the ascending travel to the platform 1000, and in a second rotational direction of rotation (opposite to the first direction of rotation) that provides the descending travel to the platform 1000. The rotatable shaft 400 is supported by at least two bearings 308 that are supported by bearing supports 307 that are mechanically fastened to each opposite frames 301 of the platform 1000 skeleton. The bearing supports 307 are substantially fastened to the middle of each frame 301 so that the axis of the shaft 400 is located in one transversal vertical plane of symmetry of the platform skeleton and underneath the skeleton. Each of the extremities of the shaft 400 extends outwardly of the bearing support 307 and is fitted with at least two coaxial reels 440. In order to minimize the amount of bending transmitted by the chain 460 to the shaft 400 when the motor-gear assembly 450 is operating, the freewheel 420 and its adapter 410 are located at a minimal distance from one of the bearing 308. For example, it is desirable that the freewheel 420 and the adapter 410 be positioned within a distance that is less than 25% of the length L1 of the shaft 400 that extends from one of the bearings 308 to the other opposite bearing 308. In an embodiment, that distance should be less than 15% of the length L1. The motor gear-reducer 450 is of the worm gear type with a Beta worm lead angle that is less than 5 degrees in order to ensure irreversibility and a self-locking static condition of the output gear-reducer shaft 431 on which is coaxially secured the sprocket 430. The irreversibility provides a self-locking of the gear shaft 431 in the clockwise and counterclockwise directions. A motor-gear reducer being well known in the art, no further description is provided. The assembly motor gear-reducer 450 is mechanically bolted to the at least two supporting frames 306 that are supported by the platform 1000 skeleton (see FIGS. 6, 7*a*). For limiting the bending of the shaft 400, the assembly motor-gear reducer 450 is located underneath the skeleton at a minimal distance from one of the bearing 308. The transmission of the torque is via a chain 460 that engages the sprocket 430 of the output shaft of the gear reducer and the freewheel 420. The freewheel 420 is secured to its adapter 410 and is mounted coaxially to the axis of the shaft 400. Without departing from the spirit of this invention the drive transmission by a chain can be replaced by a belt transmission, the freewheel can be replaced by a sprag clutch. Because a sprag clutch is well known in the art and operates the same way as a freewheel, there will be no further description.

The motor 452 is reversible and can be either AC or DC. The motor 452 can be battery operated or coupled via appropriate electric cables to an electric power source, or both. Consequently, when it is energized, the motor 452 can drive the gear reducer 451, hence its output shaft 431 and sprocket 430 in either directions of rotation, first or second. The sprocket 430 is coupled to the freewheel 420 via the chain 460 so that the sprocket 430 transmits the torque to the freewheel 420 via the chain 460. The freewheel 420 is positioned in such way that when the motor 452 is energized in a first ascending direction of rotation the chain 460 drives and rotates the freewheel 420 in a direction that drives the shaft 400, hence its reels 440 in a first direction of rotation for the ascending travel of the platform 1000. In the ascending direction, the freewheel 420 is locked so that the freewheel 420 (the outer saw-toothed periphery of the freewheel 420) and the shaft 400 rotates in unison. As a result, the cables 310, 311 attached to respective reels 440 are winding up around the reels 440. When the motor 452 is energized in the second descending direction of rotation, the chain 410 drives the freewheel 420 (the outer saw-toothed periphery of the freewheel 420) in a freewheeling rotation, hence the freewheel 420 does not drive the shaft 400, hence the motor 452 does not drive the shaft 400 in its second descending direction of rotation. In the freewheeling direction of rotation, the rotational speed of the freewheel 420 is controlled by the motor-gear ratio of the gear reducer 451. Only the force of gravity that is acting on the cables 310, 311 attached to their respective reels 440 (and platform 1000) can drive the shaft 400 in its second direction of rotation. Consequently, when the motor 452 is energized in its second direction, if the force of gravity acting on all cables 310, 311 is equal to zero (i.e. the platform 1000 does not move), because the platform 1000 is resting on its legs of equal length (FIG. 3) or on its legs of unequal length (FIG. 4*a*), the chain 460 transmits a freewheeling rotation to the freewheel 420 at a rotational speed that is dictated by the motor-gear ratio reducer, the shaft 400 cannot rotate in its second direction of rotation and consequently the cables 310, 311 can no longer unwind from their respective reels, although the motor is still rotating. This arrangement is very beneficial because it provides a safety feature in the event an obstacle is positioned under the platform 1000 when it is descending. Indeed, when the platform 1000 contacts the obstacle in a manner that the obstacle prevents the platform 1000 from further descending (the force of gravity acting on cables 310, 311 is now equals to zero), the shaft 400 stops rotating because its rotation in the descending direction is effected only by the force of gravity acting on the cables 310, 311 attached to their respective reels 440. Furthermore, in this configuration, the motor 452 cannot force the shaft 400 to rotate in the second direction and push the platform 1000 further against the obstacle due to the presence of the freewheel 420. Specifically, in that instance, the outer saw-toothed periphery of the freewheel 420, which is driven by the motor 452 via chain 460, continues to freely rotate in the second direction around the shaft 400. It will be appreciated that the cables 310, 311 stop unwinding immediately when the shaft 400 and coaxial reels 440 stop rotating, even though the outer saw-toothed periphery of the freewheel 420 continues to rotate around the immobilized shaft 400 (in particular around the second-part of the freewheel that is attached to the shaft 400).

When the motor gear reducer assembly 450 is energized in its second direction of rotation, and the force of gravity acting on all cables 310, 311 is not equal to zero, or the force of gravity acting on cables 310 only is not equal to zero (tilting travel of the platform), the platform 1000 is still in its descending travel. The force of gravity acting on the cables 310, 311 drives the respective reels 440 hence the shaft 400 in its second direction of rotation. The shaft 400 drives the freewheel 420 which rotational speed is controlled by the motor-gear ratio. As will be appreciated by the skilled artisan, the use of the freewheel 420 permits the motor-gear ratio to control the rotational speed of the shaft 400 when it rotates in the second direction, even though the motor 452 and the freewheel 420 do not drive the shaft 400 when it rotates in the second direction. Specifically, as will be appreciated by the skilled artisan, the shaft 400 is forced to rotate at a relatively high speed in the second direction due to the force of gravity acting on the cables 310, 311 (and the platform 1000). However, that speed is limited by the rotational speed of the outer saw-toothed periphery of the freewheel 420 that is imposed by the motor 452. Thus, the rotational speed of the freewheel 420 in the freewheeling (second) direction limits the rotational speed of the shaft 400. Indeed, the shaft 400 cannot rotate faster than the freewheel 420 in the second direction. As a result, the rotational speed of the outer saw-toothed periphery of the freewheel 420 imposed by the motor 452 controls the rotational speed of the shaft 400 in the second direction and, therefore, the speed of descent of the platform 1000.

When the motor gear reducer 450 is not energized in its first or second direction of rotation, and the platform is between the ceiling 200 and the floor 250, with its supporting legs not in contact with the floor 250 (because they have remained in their storage area or positioned out of their storage area), the platform 1000 remains securely locked in this position thanks to the value of the beta lead angle of the worm gear of the gear reducer. That angle needs to be lower than 5 degrees for totally preventing back driving. In other words, only the motor 452 can drive the worm gear of the gear reducer 451, and hence its output shaft 431. The output shaft of the gear reducer cannot drive the worm gear, hence cannot drive the motor in a free rotation. A worm gear speed reducer being well known in the art, no further description is provided. Although the force of gravity that is acting on the cables 310, 311 is generating, via their respective reels 440, a torque to the shaft 400, the shaft via its freewheel 420 on the chain 460 cannot drive the output shaft 431 of the gear-reducer. Consequently, when the motor 452 is not energized and the platform supporting legs 330, 331 are not in contact with the floor 250, the platform 1000 is safely stopped in whatever position between the ceiling 200 and the floor 250.

The electric system installation and control of the platform 1000 is utterly simple as it only requires to provide a power input to the motor 452 and a control system that allows three positions: a neutral position (motor 452 not energized), a position for energizing the motor 452 in its first direction of rotation (platform ascending), a position for energizing the motor 452 in its second direction of rotation (platform gravity descending). Such control can be achieved by a three positions toggle switch. The power to the motor 452 is provided via a coil cable which plugs to an outlet fitted, for example, to the ceiling 250, and to an inlet fitted to the platform 1000. Such coil power chord are well known in the art and are capable of extending or retracting to follow the descending/ascending of the platform 1000. In order to ease the placement of the input power socket to the motor 451, the platform 1000, FIG. 3, shows that its periphery is fitted with electric junction boxes 321. Any one of the junction boxes 321 is configured to receive an inlet socket for connecting to the power coil from the ceiling.

In a different embodiment the motor 452 can be controlled wirelessly via the use of a highly secure control system. Such system, for example, utilizes the highly secure Keeloq code hopping protocol to ensure reliable operation. This is not limiting. It will be appreciated that other reliable and robust wireless systems can be used. All of the wireless systems being well known in the art, there will be no further description.

The invention claimed is:

1. A load carrying platform system, comprising:

a movable platform for transporting an object between a first level and underneath a vertically-elevated second level;

a rotatable shaft mounted to the movable platform so that the rotatable shaft moves vertically with the movable platform;

a plurality of cables each fixed at a first end to the vertically-elevated second level and at a second end to the rotatable shaft;

a motor gear reducer assembly that includes a motor and a gear reducer, the motor gear reducer assembly mounted to the movable platform so that the motor gear reducer assembly moves vertically with the movable platform;

a freewheel coupled to the motor gear reducer assembly in a manner that, when the motor is energized, the motor gear reducer assembly controls a rotation of the freewheel in a first rotational direction corresponding to a vertical ascending movement of the movable platform toward the vertically-elevated second level and the rotation of the freewheel in a second rotational direction that is opposite the first rotational direction, wherein the freewheel is mounted to the rotatable shaft in a manner that, during rotation of the freewheel in the first rotational direction by the motor, the freewheel is locked to the rotatable shaft so that the freewheel and the rotatable shaft rotate in unison and the freewheel forces the rotatable shaft to rotate in the first rotational direction and wind up the cables around the rotatable shaft and, during rotation of the freewheel in the second rotational rotation direction by the motor, the freewheel is freely rotatable around the rotatable shaft so that the movable platform follows a vertical descending movement solely under the action of gravity, thereby permitting, during the vertical descending movement, that a length of a portion of a first cable of the plurality of cables, that is unwound from the rotatable shaft, be different from a length of a portion of a second cable of the plurality of the cables, that is unwound from the rotatable shaft.

2. The load carrying platform system of claim 1, wherein a speed of rotation of the rotatable shaft corresponding to the vertical descending movement of the movable platform is controlled by a gear ratio of the motor gear reducer assembly.

3. The load carrying platform system of claim 1, wherein the vertically-elevated second level defines a ceiling and wherein the first end of each of the plurality of cables is attached at the ceiling or at a position below the ceiling.

4. The load carrying platform system of claim 1, wherein the movable platform is retained by the vertically-elevated second level only via the plurality of cables so that the movable platform is movable only between the first level and a position underneath the vertically-elevated second level.

5. The load carrying platform system of claim 1, further comprising a slack removal mechanism configured to remove a slack of one or more of the plurality of cables during a tilted vertical descending movement of the movable platform during which the length of the portion of the first cable of the plurality of cables, that is unwound from the rotatable shaft, is different from the length of the portion of the second cable of the plurality of the cables, that is unwound from the rotatable shaft.

6. The load carrying platform system of claim 5, wherein the slack removal mechanism includes a spring-loaded arm coupled to the movable platform, the spring-loaded arm including a guide configured to guide the one or more of the plurality of cables, the spring-loaded arm being movable between (a) a first position corresponding to the vertical ascending movement of the movable platform or the vertical descending movement of the movable platform during which the movable platform is parallel to a horizontal plane formed by the first level and (b) a second position corresponding to the tilted vertical descending or ascending movement of the movable platform.

7. The load carrying platform system of claim 6, wherein the spring-loaded arm is automatically positioned in the second position with a spring during the tilted vertical descending movement of the movable platform.

8. The load carrying platform system of claim 6, wherein the spring-loaded arm is automatically positioned in the first position by the rewinding of the slack of the cables during the tilted vertical ascending movement of the movable platform.

9. The load carrying platform system of claim 6, further comprising a plurality of movable legs connected to the movable platform, the plurality of movable legs configured to support the movable platform on the first level.

10. The load carrying platform system of claim 9, wherein each of the plurality of movable legs are movable between a first position in which the movable leg is substantially retracted within the movable platform and a second position in which the movable leg extend away from the movable platform.

11. The load carrying platform system of claim 9, wherein at least one of the movable legs has a length that is shorter than another one of the movable legs so that the movable platform is titled relative to the horizontal plane when the movable legs support the movable platform on the first level.

12. The load carrying platform system of claim 1, wherein the motor gear reducer assembly, the rotatable shaft and the freewheel are arranged underneath the movable platform.

13. The load carrying platform of claim 1, wherein the rotatable shaft is provided substantially at a center of the movable platform.

14. The load carrying platform of claim 1, further comprising a movable trigger extending below the movable platform, the movable trigger configured to de-energize the motor when actuated.

15. The load carrying platform of claim 1, further comprising a plurality of reels provided at each end of the rotatable shaft and co-axially with a longitudinal axis of the rotatable shaft.

16. The load carrying platform of claim 15, wherein each of the plurality of cables is attached to a different one of the plurality of reels.

17. The load carrying platform of claim 16, wherein the plurality of reels is four and the plurality of cables is four.

18. The load carrying platform of claim 1, wherein portions of all of the plurality of cables, that are unwound from the rotatable shaft, have equal length during the vertical descending movement of the movable platform.

* * * * *